(12) United States Patent
Chen et al.

(10) Patent No.: US 11,104,348 B2
(45) Date of Patent: Aug. 31, 2021

(54) VEHICLE ALARM APPARATUS

(71) Applicant: Mazda Motor Corporation, Hiroshima (JP)

(72) Inventors: Xi Chen, Aki-gun (JP); Takashi Nakagami, Aki-gun (JP); Shota Katayama, Aki-gun (JP); Rie Tezuka, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 17/040,056

(22) PCT Filed: Mar. 8, 2019

(86) PCT No.: PCT/JP2019/009270
§ 371 (c)(1),
(2) Date: Sep. 22, 2020

(87) PCT Pub. No.: WO2019/188112
PCT Pub. Date: Oct. 3, 2019

(65) Prior Publication Data
US 2021/0024076 A1 Jan. 28, 2021

(30) Foreign Application Priority Data

Mar. 28, 2018 (JP) .............................. JP2018-061794

(51) Int. Cl.
*B60W 50/14* (2020.01)
*B60W 40/08* (2012.01)
(Continued)

(52) U.S. Cl.
CPC ............. *B60W 40/08* (2013.01); *B60Q 9/008* (2013.01); *B60W 50/14* (2013.01); *G08B 21/06* (2013.01); *B60W 2040/0827* (2013.01)

(58) Field of Classification Search
CPC ................. B60W 40/08; B60W 50/14; B60W 2040/0827; B60Q 9/008; G08B 21/06; G08G 1/16
See application file for complete search history.

(56) References Cited

U.S. PATENT DOCUMENTS

2005/0154505 A1* 7/2005 Nakamura ........... G01C 21/365
  701/1
2007/0146146 A1 6/2007 Kopf et al.
(Continued)

FOREIGN PATENT DOCUMENTS

| JP | 2006-244343 A | 9/2006 |
| JP | 2007-069679 A | 3/2007 |
| JP | 2008-282168 A | 11/2008 |

OTHER PUBLICATIONS

Extended European search report dated Mar. 24, 2021, in corresponding European patent Application No. 19776198.4, 8 pages.
(Continued)

*Primary Examiner* — Munear T Akki
(74) *Attorney, Agent, or Firm* — Xsensus LLP

(57) ABSTRACT

A line-of-sight determination unit of a vehicle alarm apparatus determines the line-of-sight direction, based on a face orientation and a pupil that are included in a captured image of a driver. A driving operation detection unit detects a requested acceleration based on an accelerator operation of the driver, or a turn-signal-lamp switch operation for activating a turn signal lamp of a vehicle. A controller sets an alarm timing, based on an output of the line-of-sight determination unit and an output of the driving operation detection unit. When the requested acceleration that is equal to or more than a predetermined acceleration, or the turn-signal-lamp switch operation is detected, the controller activates an alarm device at a timing more delayed than the alarm timing.

19 Claims, 5 Drawing Sheets

(51) Int. Cl.
 *B60Q 9/00* (2006.01)
 *G08B 21/06* (2006.01)

(56) References Cited

U.S. PATENT DOCUMENTS

| | | | |
|---|---|---|---|
| 2007/0279755 A1* | 12/2007 | Hitschmann | G02B 27/0101 |
| | | | 359/630 |
| 2009/0303158 A1* | 12/2009 | Takahashi | G02B 27/0093 |
| | | | 345/7 |
| 2012/0050138 A1* | 3/2012 | Sato | G02B 27/017 |
| | | | 345/4 |
| 2012/0268262 A1* | 10/2012 | Popovic | G08G 1/166 |
| | | | 340/438 |
| 2015/0294547 A1 | 10/2015 | Ito et al. | |
| 2017/0039438 A1* | 2/2017 | Homma | B60R 1/00 |
| 2018/0148072 A1* | 5/2018 | Kamiya | G06K 9/00832 |
| 2018/0201276 A1* | 7/2018 | Matsumura | B60W 50/14 |
| 2019/0111844 A1* | 4/2019 | Suzuki | G06F 3/013 |

OTHER PUBLICATIONS

International Search Report and Written Opinion dated May 21, 2019 for PCT/JP2019/009270 filed on Mar. 8, 2019, 7 pages including English Translation of the International Search Report.

\* cited by examiner

200

| ESTABLISHMENT REQUIREMENT (ALTERNATIVE) | FIRST DELAY CONDITION | SECOND DELAY CONDITION |
|---|---|---|
| STEERING ANGLE IS EQUAL TO OR MORE THAN PREDETERMINED ANGLE | | ○ |
| TURNING RADIUS IS LESS THAN PREDETERMINED RADIUS | | ○ |
| STEERING ANGLE VELOCITY IS EQUAL TO OR MORE THAN PREDETERMINED ANGLE VELOCITY | | ○ |
| (VEHICLE VELOCITY × STEERING ANGLE) IS EQUAL TO OR MORE THAN PREDETERMINED VALUE | | ○ |
| ACCELERATOR PEDAL IS TURNED OFF | | ○ |
| BRAKE PEDAL IS TURNED ON | | ○ |
| REQUESTED ACCELERATION BY DRIVER IS EQUAL TO OR MORE THAN PREDETERMINED ACCELERATION | ○ | |
| BLINKER SWITCH IS TURNED ON | ○ (VEHICLE VELOCITY IS EQUAL TO OR MORE THAN V1 [Km/h]) | ○ (VEHICLE VELOCITY IS LESS THAN V1 [Km/h]) |

| SETTING TIMING | INATTENTIVE-DRIVING-BASED ADVANCEMENT REQUEST | SUCCESS OR FAILURE OF FIRST-DELAY-CONDITION ||  SUCCESS OR FAILURE OF SECOND-DELAY-CONDITION ||
|---|---|---|---|---|---|
| | | SUCCESS | FAILURE | SUCCESS | FAILURE |
| EARLY | PRESENT | EARLY | EARLY | DELAY | EARLY |
| | ABSENT | DELAY | EARLY | DELAY | EARLY |
| MEDIUM | PRESENT | EARLY | EARLY | DELAY | EARLY |
| | ABSENT | DELAY | MEDIUM | DELAY | MEDIUM |
| LATE | PRESENT | LATE | LATE | DELAY | LATE |
| | ABSENT | DELAY | LATE | DELAY | LATE |

FIG. 3

VEHICLE ALARM APPARATUS

CROSS-REFERENCE TO RELATED APPLICATIONS

The present application is based on PCT filing PCT/JP2019/009270, filed Mar. 8, 2019, which claims priority to JP 2018-061794, filed Mar. 28, 2018, the entire contents of each are incorporated herein by reference.

TECHNICAL FIELD

The technology disclosed herein relates to a vehicle alarm apparatus that issues an alarm to a driver.

BACKGROUND ART

A vehicle alarm apparatus has been conventionally known which detects an inattentive driving state of a driver of a vehicle and advances a timing of issuing an alarm according to the inattentive driving state (see, for example, Patent Literature 1). In this vehicle alarm apparatus, on an assumption that the alarm is issued when a possibility of collision with a front obstacle reaches a threshold, duration of the inattentive driving of the driver is detected, and as the duration of the inattentive driving is longer, the threshold of the possibility of collision is made smaller, so that the timing of issuing the alarm is advanced.

However, it is also conceivable that even when it is determined from the line-of-sight direction of the driver that the driver is inattentive while driving, the driver is actually only checking a situation around the vehicle and not inattentive while driving. In that case, by the advanced timing of issuing the alarm, the driver may feel annoyed at the alarm.

CITATION LIST

Patent Literature

Patent Literature 1: Japanese Patent Laid-Open No. 2007-69679

SUMMARY OF INVENTION

The technology disclosed herein has an object to reduce a situation where a driver feels annoyed at an alarm.

To solve the above-described problem, an aspect of the technology disclosed herein is a vehicle alarm apparatus that activates an alarm device at an alarm timing based on a predicted time to collision with an obstacle in front of a vehicle, the vehicle alarm apparatus including an obstacle detection unit configured to detect the obstacle, an image-capturing unit configured to capture an image of a driver, a line-of-sight determination unit configured to determine a line-of-sight direction, based on a face orientation and a pupil that are included in a captured image of the driver, a driving operation detection unit configured to detect a requested acceleration based on an accelerator operation of the driver, or a turn-signal-lamp switch operation for activating a turn signal lamp of the vehicle, and a controller configured to set the alarm timing, based on an output of the line-of-sight determination unit and an output of the driving operation detection unit, wherein when the requested acceleration that is equal to or more than a predetermined acceleration, or the turn-signal-lamp switch operation is detected, the controller activates the alarm device at a timing more delayed than the alarm timing.

According to this vehicle alarm apparatus, a situation where the driver feels annoyed at an alarm can be reduced.

BRIEF DESCRIPTION OF DRAWINGS

FIG. 2 is a view schematically showing an example of delay information representing establishment requirements of delay conditions.

FIG. 3 is a view schematically showing an example of control information of an alarm timing.

Figure 1:
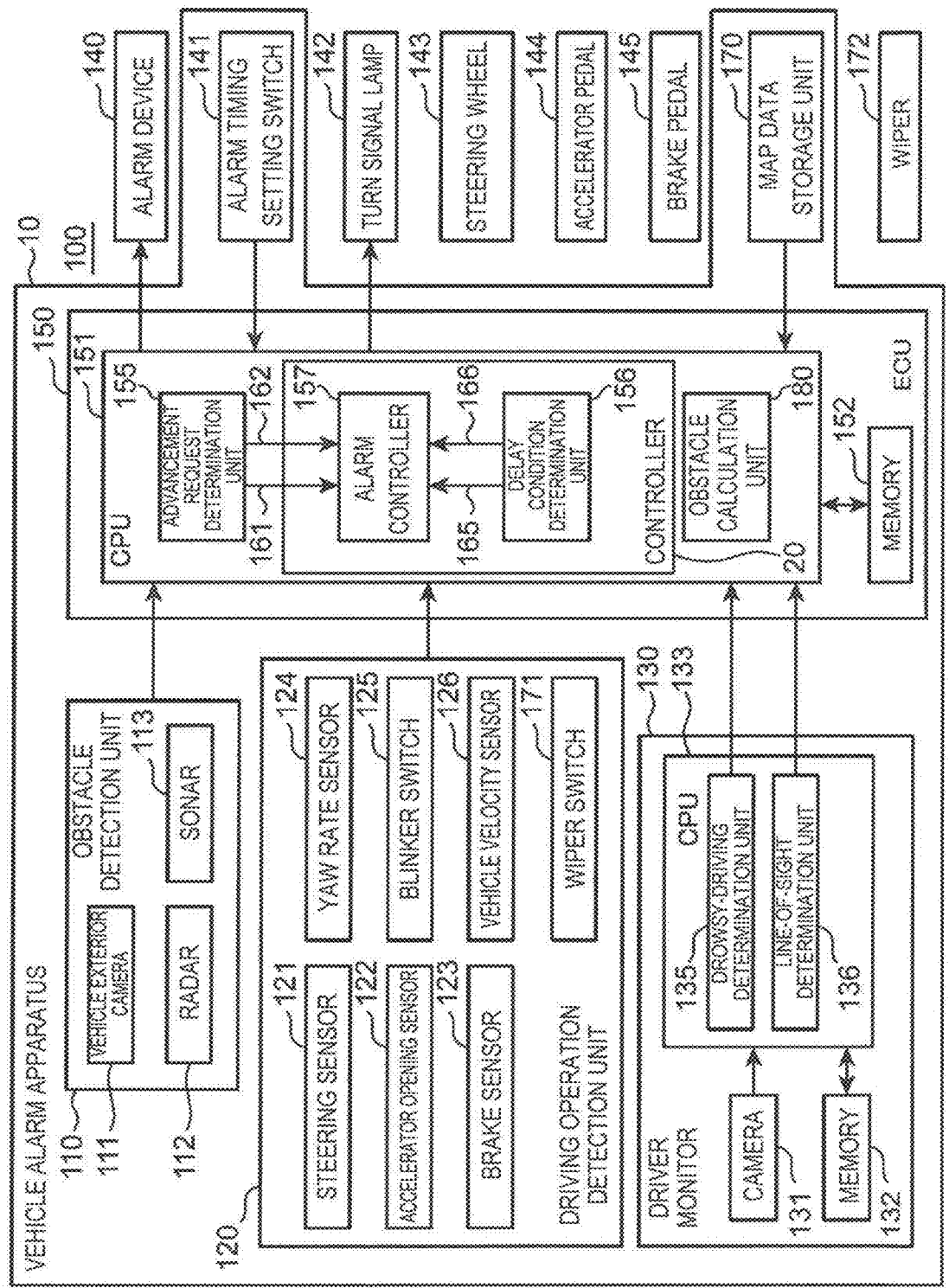
FIG. 1 is a block diagram schematically showing a configuration of a vehicle equipped with a vehicle alarm apparatus.

DESCRIPTION OF EMBODIMENT (Viewpoint of an Aspect According to the Present Disclosure)

First, a viewpoint of an aspect according to the present disclosure will be explained. Typically, in a vehicle equipped with a driving support apparatus, when a preceding vehicle is detected and an inter-vehicle distance with respect to the preceding vehicle becomes short, an alarm device is activated before an automatic brake is activated, and an alarm is issued to a driver. A timing of activating the automatic brake is previously determined according to, for example, the inter-vehicle distance and a relative velocity with respect to the preceding vehicle. In contrast, a timing of activating the alarm device is, as in the technology disclosed in Patent Literature 1, sometimes advanced according to, for example, a state of the driver. However, as described above, by the advanced timing of activating the alarm device, the driver may feel annoyed at the alarm. Accordingly, the present inventors have conceived of a vehicle alarm apparatus that determines, for example, an intention of a driver from, for example, a driving operation of the driver on a vehicle and respects, for example, the determined intention of the driver so as to be able to reduce a situation where the driver feels annoyed at an alarm.

EMBODIMENT

Hereinafter, an embodiment of the present disclosure will be explained with reference to the drawings. In the drawings, like elements are marked with the same reference signs, and description thereof is omitted as appropriate.

(Configurations)

FIG. 1 is a block diagram schematically showing a configuration of a vehicle 100 equipped with a vehicle alarm apparatus 10 of the present embodiment. The vehicle 100 is, for example, a four-wheeled automobile. The vehicle 100 includes, for example, as shown in FIG. 1, the vehicle alarm apparatus 10, an alarm device 140, a turn signal lamp 142, a steering wheel 143, an accelerator pedal 144, and a brake pedal 145. The vehicle alarm apparatus 10 includes an obstacle detection unit 110, a driving operation detection unit 120, a driver monitor 130, an alarm timing setting switch 141, and an electronic control unit (ECU) 150. The ECU 150 controls an entire operation of the vehicle 100. The ECU 150 includes, for example, a central processing unit (CPU) 151, a memory 152, and other peripheral circuits (illustration omitted).

The obstacle detection unit 110 detects an obstacle present in front of the vehicle 100. The obstacle detection unit 110 includes, for example, a vehicle exterior camera 111, a radar 112, and a sonar 113. The vehicle exterior camera 111 is attached to, inside the vehicle 100, for example, the back face side of a rear-view mirror or the vicinity of an upper end of a windshield so that an optical axis of the vehicle exterior camera 111 faces toward the front of the vehicle 100.

The vehicle exterior camera 111 captures an image in a fan-shaped image-capturing range around the optical axis per a predetermined time (for example, $\frac{1}{60}$ second). The vehicle exterior camera 111 outputs data of the captured image to the CPU 151 of the ECU 150 per a predetermined time (for example, $\frac{1}{60}$ second). Based on the image data output from the vehicle exterior camera 111, the CPU 151 uses, for example, template matching and detects the obstacle present in front of the vehicle 100, a vehicle traveling ahead, for example, in front of the vehicle 100, a pedestrian walking in the vicinity of a traveling lane, a traffic sign installed on a roadside, and the like.

The radar 112 emits, for example, a millimeter wave, which is a radio wave having a wavelength of 1 to 10 mm, and receives a reflected wave of the emitted millimeter wave reflected by the obstacle, thereby detecting the obstacle in front of the vehicle 100. The radar 112 is attached to a center of a front face of the vehicle 100 (for example, a center of a front grille) so that the emission direction of the millimeter wave faces toward the front of the vehicle 100. The sonar 113 emits an acoustic wave and receives a reflected wave of the emitted acoustic wave reflected by the obstacle, thereby detecting the obstacle. The sonar 113 is attached to the center of the front face of the vehicle 100 (for example, a center of a lower portion of a front window) so that the emission direction of the acoustic wave faces toward the front of the vehicle 100. The radar 112 and the sonar 113 each output a detection signal to the CPU 151.

The driving operation detection unit 120 detects a driving operation performed by a driver on the vehicle 100. The driving operation detection unit 120 includes, for example, a steering sensor 121, an accelerator opening sensor 122, a brake sensor 123, a yaw rate sensor 124, a blinker switch 125, and a vehicle velocity sensor 126. Each detection signal of the driving operation detection unit 120 is output to the CPU 151.

The steering sensor 121 detects a steering angle of the steering wheel 143 operated by the driver. The accelerator opening sensor 122 detects an amount of depression when the accelerator pedal 144 is depressed by the driver. The brake sensor 123 detects whether the brake pedal 145 is operated by the driver. The yaw rate sensor 124 is formed of, for example, a rate gyroscope and detects a rotation angle velocity (yaw rate) around a vertical axis of the vehicle 100. The yaw rate can also be said to be a speed at which a yaw angle indicating the relative direction of the vehicle 100 with respect to the road changes.

The blinker switch 125 is formed of, for example, a lever extending from a steering column and is operated by the driver. The CPU 151, according to an operation content of the blinker switch 125, causes the turn signal lamp 142 for displaying a left or right turn to blink. The vehicle velocity sensor 126 detects a velocity of the vehicle 100. A configuration may be employed in which the vehicle velocity sensor 126 detects a rotation velocity of a wheel of the vehicle 100 and, based on the detected rotation velocity of the wheel, the CPU 151 calculates the velocity of the vehicle 100.

The driver monitor 130 determines a state of the driver. The driver monitor 130 includes, for example, a camera 131, a memory 132, and a CPU 133. The camera 131 captures an image of the driver of the vehicle 100 from the front. The camera 131 (corresponds to an example of an "image-capturing unit") is attached to, for example, the vicinity of the upper end of the windshield in front of a driver's seat of the vehicle 100 so that an optical axis of the camera 131 faces toward the driver's seat. The camera 131 outputs data of the captured image to the CPU 133. As the camera 131, a plurality of cameras may be attached to a front pillar on the passenger seat side, a ceiling inside the vehicle 100, and the like so that each optical axis faces toward the driver's seat of the vehicle 100.

The memory 132 is formed of, for example, a semiconductor memory, a hard disk, or another storage element. The memory 132 includes, for example, a read only memory (ROM), a random access memory (RAM), and an electrically erasable and rewritable ROM (EEPROM). The memory 132 stores a control program that causes the CPU 133 to operate. The memory 132 may be formed of a single memory including an area for storing the control program and an area for temporarily storing data.

The CPU 133 operates according to the control program stored in the memory 132 and thereby functions as a drowsy-driving determination unit 135 and a line-of-sight determination unit 136. The drowsy-driving determination unit 135 determines, for example, a face orientation and an eye opening and closing degree of the driver from the image data obtained by the camera 131 and, based on the determination result, determines whether the driver is drowsy while driving. The drowsy-driving determination unit 135, when determining that the driver is drowsy while driving, notifies the CPU 151 of the fact.

The line-of-sight determination unit 136 determines, for example, the face orientation and a pupil position of the driver from the image data obtained by the camera 131 and, based on the determination result, determines the line-of-sight direction of the driver (namely, an area visually recognized by the driver). From the determined line-of-sight direction of the driver, the line-of-sight determination unit 136 determines whether the driver is inattentive (namely, the driver is not looking toward the front of the vehicle 100). The line-of-sight determination unit 136, when determining that the driver is inattentive, counts an inattentive time. When the time in which the driver is inattentive continues for a predetermined time (for example, 3 seconds), the line-of-sight determination unit 136 determines that the driver is inattentive while driving, and notifies the CPU 151 of the fact.

The alarm device 140 is an instrument for issuing an alarm to the driver. The alarm device 140 is formed of, for example, an electronic buzzer, a speaker, or a bell and issues an alarm sound. Alternatively, the alarm device 140 may be formed of a display such as an LED. As the alarm device 140, a plurality of instruments such as an electronic buzzer, a bell, a speaker, and a display may be included.

The alarm timing setting switch 141 is operated by the driver and is a switch for setting an alarm timing to activate the alarm device 140. The alarm timing setting switch 141 may be formed of a mechanical switch provided in the vehicle 100. Alternatively, the alarm timing setting switch 141 may be formed of a button displayed on a touch panel display.

In the present embodiment, it is configured so that the driver of the vehicle 100 can select and set a favorite alarm timing from three stages of "early," "medium," and "late" by using the alarm timing setting switch 141. Specifically, the alarm timing is set based on a predicted time to collision (time to collision). The predicted time to collision is a limit time until collision in which collision with an obstacle in front can be avoided by braking and steering. Namely, when an operation of braking and steering is started at a time when the predicted time to collision is reached, collision with the obstacle in front can be avoided just before the collision.

In the present embodiment, the "early" alarm timing is T1 seconds before the time when the predicted time to collision is reached, the "medium" alarm timing is T2 seconds before the time when the predicted time to collision is reached, and the "late" alarm timing is T3 seconds before the time when the predicted time to collision is reached. Here, T1>T2>T3 holds. In the present embodiment, the "late" alarm timing corresponds to an example of a "latest timing."

Setting the alarm timing T1, T2, or T3 seconds before the time when the predicted time to collision is reached means that there is a margin of respectively T1, T2, or T3 seconds from the activation of the alarm device 140 to the operation for avoiding collision. Namely, in the present embodiment, the margin time until the time when the predicted time to collision is reached becomes longer in the order of T1, T2, and T3.

Typically, a driver who is familiar with driving feels annoyed when the alarm device 140 is activated, and thus it is conceivable that such a driver sets the "late" alarm timing by using the alarm timing setting switch 141. Meanwhile, a driver who is not familiar with driving wants the alarm device 140 to be activated earlier, and thus it is conceivable that such a driver sets the "early" alarm timing by using the alarm timing setting switch 141.

The memory 152 of the ECU 150 is formed of, for example, a semiconductor memory, a hard disk, or another storage element. The memory 152 includes, for example, an ROM, an RAM, and an EEPROM. The memory 152 stores a control program that causes the CPU 151 to operate. The memory 152 may be formed of a single memory including an area for storing the control program and an area for temporarily storing data.

The CPU 151 operates according to the control program stored in the memory 152 and thereby functions as an advancement request determination unit 155 and a controller 20. The controller 20 includes a delay condition determination unit 156 and an alarm controller 157. The advancement request determination unit 155 notifies the alarm controller 157 of an advancement request for requesting advancement of the alarm timing, based on a signal from the CPU 133 of the driver monitor 130.

Specifically, the advancement request determination unit 155, when receiving a notification from the drowsy-driving determination unit 135 that the driver is drowsy while driving, acquires the vehicle velocity of the vehicle 100 from the vehicle velocity sensor 126 and determines whether the vehicle 100 is stopping. If the vehicle 100 is not stopping (namely, if the vehicle 100 is traveling), the advancement request determination unit 155 outputs to the alarm controller 157 a first advancement request flag 161 representing the presence or absence of the advancement request based on drowsy driving.

The advancement request determination unit 155, when receiving a notification from the line-of-sight determination unit 136 that the driver is inattentive while driving, acquires the vehicle velocity of the vehicle 100 from the vehicle velocity sensor 126 and determines whether the vehicle 100 is stopping. If the vehicle 100 is not stopping (namely, if the vehicle 100 is traveling), the advancement request determination unit 155 outputs to the alarm controller 157 a second advancement request flag 162 representing the presence or absence of the advancement request based on inattentive driving.

The delay condition determination unit 156 determines, as a delay condition for delaying the alarm timing, whether a first delay condition is established and whether a second delay condition is established, based on the driving operation of the driver detected by the driving operation detection unit 120. The delay condition determination unit 156 outputs to the alarm controller 157 a first determination flag 165 representing whether the first delay condition is established, and a second determination flag 166 representing whether the second delay condition is established.

FIG. 2 is a view schematically showing an example of delay information 200 representing establishment requirements of the delay conditions. This delay information 200 is stored in the memory 152 as the control program of the present embodiment. When any of the establishment requirements indicated at the leftmost column of the delay information 200 is established, the delay condition determination unit 156 determines that, of the first delay conditions indicated at the center column of the delay information 200 or the second delay conditions indicated at the rightmost column, a marked delay condition is established.

Specifically, when the steering angle of the steering wheel 143 detected by the steering sensor 121 is equal to or more than a predetermined angle, the delay condition determination unit 156 determines that the second delay condition is established.

The delay condition determination unit 156 calculates a turning radius R, from a velocity V of the vehicle 100 detected by the vehicle velocity sensor 126 and a yaw rate ω detected by the yaw rate sensor 124, by using the following formula.

$$R = V/\omega$$

When the calculated turning radius R is less than a predetermined radius, the delay condition determination unit 156 determines that the second delay condition is established.

The delay condition determination unit 156 calculates an angle velocity of the steering angle of the steering wheel 143 from an amount of change in the detection result of the steering sensor 121 per unit time. When the calculated angle velocity is equal to or more than a predetermined angle velocity, the delay condition determination unit 156 determines that the second delay condition is established.

when the product (velocity×steering angle) of the velocity of the vehicle 100 detected by the vehicle velocity sensor 126 and the steering angle of the steering wheel 143 detected by the steering sensor 121 is equal to or more than a predetermined value, the delay condition determination unit 156 determines that the second delay condition is established.

When an amount of depression of the accelerator pedal 144 detected by the accelerator opening sensor 122 is zero, the delay condition determination unit 156 determines that the accelerator pedal 144 is turned off, and determines that the second delay condition is established. When it is detected by the brake sensor 123 that the brake pedal 145 is turned on, the delay condition determination unit 156 determines that the second delay condition is established.

When a requested acceleration by the driver is equal to or more than a predetermined acceleration, the delay condition determination unit 156 determines that the first delay condition is established. The requested acceleration by the driver corresponds to the amount of depression of the accelerator pedal 144 detected by the accelerator opening sensor 122. Namely, when the amount of depression of the accelerator pedal 144 detected by the accelerator opening sensor 122 is equal to or more than a predetermined amount of depression, the delay condition determination unit 156 determines that the first delay condition is established. The requested acceleration by the driver means an acceleration of the vehicle 100 intended by the driver. Namely, at a time when it is determined by the delay condition determination unit 156 that the requested acceleration by the driver is equal to or more than the predetermined acceleration, the acceleration of the vehicle 100 has not yet reached the requested acceleration by the driver.

when the blinker switch 125 is turned on and the velocity of the vehicle 100 detected by the vehicle velocity sensor 126 is equal to or more than a predetermined velocity V1 [km/h], the delay condition determination unit 156 determines that the first delay condition is established. When the blinker switch 125 is turned on and the velocity of the vehicle 100 detected by the vehicle velocity sensor 126 is less than the predetermined velocity V1 [km/h], the delay condition determination unit 156 determines that the second delay condition is established. The predetermined velocity V1 is determined empirically. The predetermined velocity V1 may be set to a value satisfying, for example, $50 \leq V1 \leq 70$.

The meanings of the establishment requirements indicated at the leftmost column of the delay information 200 are as follows. As to each of the establishment requirements that "the steering angle of the steering wheel is equal to or more than the predetermined angle," "the turning radius R is less than the predetermined radius," "the angle velocity of the steering angle of the steering wheel is equal to or more than the predetermined angle velocity," and "(velocity×steering angle) is equal to or more than the predetermined value," the delay condition determination unit 156 determines that the vehicle 100 is traveling on a curved road, and determines that the second delay condition is established.

As to the establishment requirement that "the accelerator pedal 144 is turned off," the delay condition determination unit 156 determines that the vehicle 100 is traveling at a constant velocity, and determines that the second delay condition is established. As to the establishment requirement that "the brake pedal 145 is turned on," the delay condition determination unit 156 determines that the vehicle 100 is decelerating, and determines that the second delay condition is established. As to the establishment requirement that "the blinker switch 125 is turned on and the velocity of the vehicle 100 is less than the predetermined velocity V1 [km/h]," the delay condition determination unit 156 determines that the vehicle 100 is turning left or right at an intersection, and determines that the second delay condition is established.

As to each of the establishment requirements that "the requested acceleration by the driver is equal to or more than the predetermined acceleration" and "the blinker switch 125 is turned on and the velocity of the vehicle 100 is equal to or more than the predetermined velocity V1 [km/h]," the delay condition determination unit 156 determines that the vehicle 100 intends to pass a vehicle in front and subsequently that it is an operation representing a steering intention that the driver tries to steer the steering wheel 143, and determines that the first delay condition is established.

Returning to FIG. 1, the alarm controller 157 controls the alarm timing to activate the alarm device 140. Specifically, the alarm controller 157, when receiving from the advancement request determination unit 155 the first advancement request flag 161 representing the presence of the advancement request based on drowsy driving, regardless of the alarm timing set by using the alarm timing setting switch 141, changes the alarm timing to "early."

Furthermore, the alarm controller 157 changes or maintains the alarm timing set by using the alarm timing setting switch 141, based on the second advancement request flag 162 input from the advancement request determination unit 155, and the first determination flag 165 and the second determination flag 166 that are input from the delay condition determination unit 156.

FIG. 3 is a view schematically showing an example of control information 300 of the alarm timing. This control information 300 is stored in the memory 152 as the control program of the present embodiment. The alarm controller 157 determines the alarm timing as indicated in the control information 300. In the control information 300, the alarm timing is determined from a setting timing 301 set by the alarm timing setting switch 141, the presence or absence of an inattentive-driving-based advancement request 302, success or failure of the first-delay-condition 303, and success or failure of the second-delay-condition 304.

In FIG. 3, the "delay" alarm timing is an even later timing than the "late" alarm timing set by the alarm timing setting switch 141 and is T4 seconds before the time when the predicted time to collision is reached (T3>T4). Therefore, when the alarm timing is determined to be "delay," the alarm device 140 is not activated until T4 seconds before the time when the predicted time to collision is reached. Thus, when a time until the time when the predicted time to collision is reached is extended by performing a collision avoidance operation by T4 seconds before the time when the predicted time to collision is reached, the activation of the alarm device 140 can be avoided. As a result, a situation where the driver feels annoyed at the activation of the alarm device 140 can be reduced.

In the control information 300 shown in FIG. 3, the alarm timing is determined based on the following two concepts. First, when the inattentive-driving-based advancement request 302 is present and the success or failure of the first-delay-condition 303 indicates success, the control information 300 is set so that the priority becomes higher in the order of (advancement request)>(first delay condition). Namely, even when the success or failure of the first-delay-condition 303 indicates success, when the inattentive-driving-based advancement request 302 is present, the advancement request based on inattentive driving is prioritized.

As described above, the delay condition determination unit 156, when determining that the vehicle 100 intends to pass the vehicle in front and subsequently that the driver has a steering invention to try to steer the steering wheel 143, determines that the first delay condition is established. When the driver intends to pass the vehicle in front, when the vehicle in front suddenly decelerates while the driver is inattentive while driving, the possibility of a rear-end collision increases. Accordingly, in the present embodiment, even when the success or failure of the first-delay-condition 303 indicates success, when the inattentive-driving-based advancement request 302 is present, the advancement request based on inattentive driving is prioritized.

Furthermore, when the inattentive-driving-based advancement request 302 is present and the success or failure of the second-delay-condition 304 indicates success, the control information 300 is set so that the priority becomes higher in the order of (second delay condition)>

(advancement request). Namely, even when the inattentive-driving-based advancement request 302 is present, when the success or failure of the second-delay-condition 304 indicates success, the second delay condition is prioritized.

As described above, the delay condition determination unit 156, when determining that the vehicle 100 is traveling on a curved road, that the vehicle 100 is traveling at a constant velocity or decelerating, or that the vehicle 100 is turning left or right at an intersection, determines that the second delay condition is established. When the vehicle 100 is traveling in such a manner, it is highly likely that because the driver directs his or her line of sight to an area other than the front of the vehicle 100 to visually recognize a situation around the vehicle 100, the driver is determined to be inattentive while driving. Accordingly, in the present embodiment, even when the inattentive-driving-based advancement request 302 is present, when the success or failure of the second-delay-condition 304 indicates success, the establishment of the second delay condition is prioritized. Thus, in FIG. 3, the control information 300 is set so that the priority becomes higher in the order of (second delay condition)>(advancement request)>(first delay condition).

Second, in the control information 300 in FIG. 3, when the setting timing 301 by the alarm timing setting switch 141 is the "late" alarm timing, even when the inattentive-driving-based advancement request 302 is present, this advancement request is ignored. Namely, even when the inattentive-driving-based advancement request 302 is present and the success or failure of the second-delay-condition 304 indicates failure, when the setting timing 301 by the alarm timing setting switch 141 is the "late" alarm timing, it is not advanced to the "medium" alarm timing, and the "late" alarm timing is maintained. As described above, a driver who is familiar with driving feels annoyed when the alarm device 140 is activated, and thus it is conceivable that such a driver sets the "late" alarm timing by using the alarm timing setting switch 141. Accordingly, in the present embodiment, when the "late" alarm timing is set by the alarm timing setting switch 141, even when the inattentive-driving-based advancement request 302 is present, the decision of the driver in setting the "late" alarm timing is respected, and the advancement request is ignored.

In the control information 300 in FIG. 3, the alarm timing when the second delay condition is not established is described in the column of the success or failure of the first-delay-condition 303, and the alarm timing when the first delay condition is not established is described in the column of the success or failure of the second-delay-condition 304. Therefore, the alarm timing in the column in which the success or failure of the first-delay-condition 303 indicates failure and the alarm timing in the column in which the success or failure of the second-delay-condition 304 indicates failure are the same.

Furthermore, when the success or failure of the first-delay-condition 303 indicates success and the success or failure of the second-delay-condition 304 indicates success, namely, when both the first delay condition and the second delay condition are established, success of the success or failure of the second-delay-condition 304 is prioritized based on the above concept on the priority.

Specifically, in the control information 300 in FIG. 3, the alarm timing is determined as follows. First, when the success or failure of the second-delay-condition 304 indicates success, the second delay condition is prioritized the most based on the above first concept, and thus regardless of the presence or absence of the inattentive-driving-based advancement request 302, and the success or failure of the first-delay-condition 303, the alarm timing is determined to be "delay," which is later than the setting timing 301 by the alarm timing setting switch 141. In the present embodiment, the "delay" alarm timing corresponds to an example of a "delayed timing."

Next, when the success or failure of the first-delay-condition 303 indicates success, and when the success or failure of the second-delay-condition 304 indicates failure and the inattentive-driving-based advancement request 302 is absent, regardless of the setting timing 301 by the alarm timing setting switch 141, the alarm timing is determined to be "delay." Thus, when the success or failure of the first-delay-condition 303 indicates success, when the inattentive-driving-based advancement request 302 is absent, it is determined that the driver may be positively performing a driving operation, and respecting the decision of the driver, the alarm controller 157 determines the alarm timing to the "delay" alarm timing.

Next, a case will be explained where the success or failure of the first-delay-condition 303 indicates success, where the success or failure of the second-delay-condition 304 indicates failure, and where the inattentive-driving-based advancement request 302 is present. When the setting timing 301 by the alarm timing setting switch 141 is the "early" or "medium" alarm timing, the inattentive-driving-based advancement request 302 is prioritized based on the above first concept. Therefore, when the setting timing 301 by the alarm timing setting switch 141 is the "early" alarm timing, the "early" alarm timing is maintained since no earlier timing is set, and in the case of the "medium" alarm timing, it is advanced to the "early" alarm timing. Meanwhile, the setting timing 301 by the alarm timing setting switch 141 is the "late" alarm timing, the "late" alarm timing is maintained based on the above second concept.

Next, in a case where the success or failure of the first-delay-condition 303 indicates failure, where the success or failure of the second-delay-condition 304 indicates failure, and where the inattentive-driving-based advancement request 302 is absent, namely, when all are failure or absent, the alarm timing is, of course, determined according to the setting timing 301 by the alarm timing setting switch 141. The alarm timing set by the alarm timing setting switch 141 corresponds to an example of a "previously determined alarm timing."

Last, in a case where the success or failure of the first-delay-condition 303 indicates failure, where the success or failure of the second-delay-condition 304 indicates failure, and where the inattentive-driving-based advancement request 302 is present, when the setting timing 301 by the alarm timing setting switch 141 is the "early" alarm timing, the "early" alarm timing is maintained since no earlier timing is set, and in the case of the "medium" alarm timing, it is advanced to the "early" alarm timing. Meanwhile, in the case of the "late" alarm timing, the "late" alarm timing is maintained based on the above second concept. In the control information 300 shown in FIG. 3, the alarm timing is determined based on the two concepts as above.

(Operations)

Figure 4:
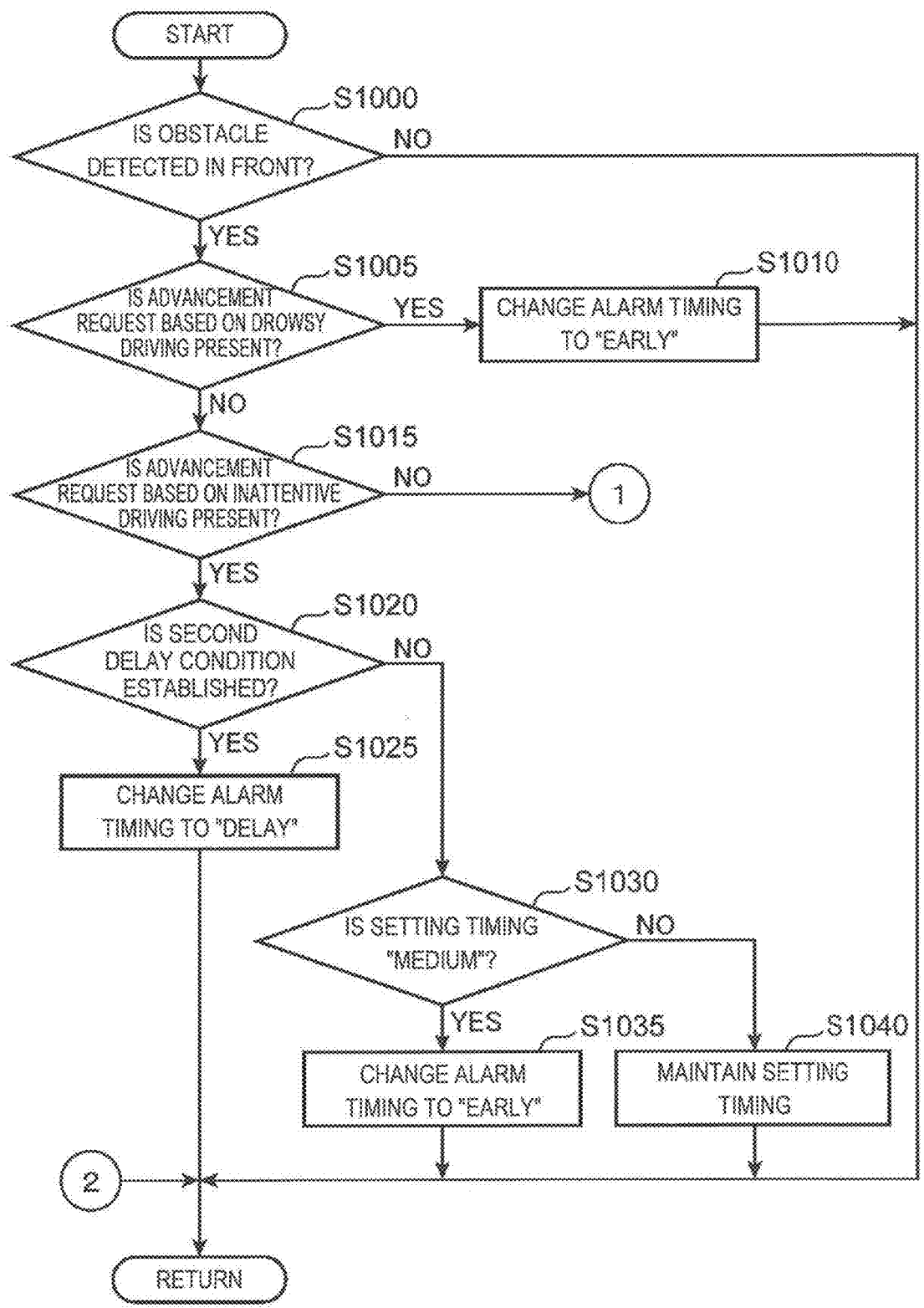
FIG. 4 is a flowchart showing an operation example of alarm timing control.
Figure 5:
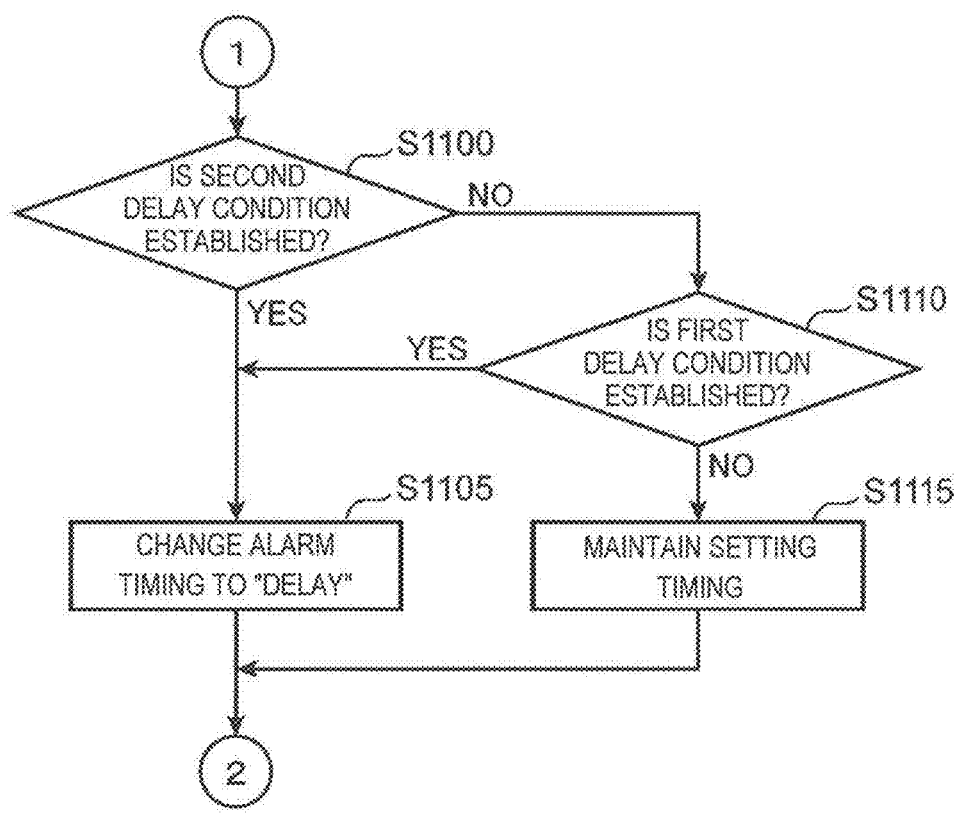
FIG. 5 is a flowchart showing an operation example of alarm timing control.

FIGS. 4 and 5 are flowcharts schematically showing an operation example of alarm timing control. For example, when an engine of the vehicle 100 is started, operations shown in FIGS. 4 and 5 are executed at a predetermined time interval (for example, 50 msec). The alarm timing setting switch 141 is operated in advance by the driver, and the alarm timing set by the driver is stored in the memory 152.

In step S1000, the alarm controller 157 determines whether an obstacle is present in front of the vehicle 100, based on the detection signal from the obstacle detection unit 110. If the obstacle is present in front of the vehicle 100 (YES in step S1000), the processing proceeds to step S1005. Meanwhile, if no obstacle is present in front of the vehicle 100 (NO in step S1000), the operation in FIG. 4 ends.

In step S1005, the alarm controller 157 determines whether the first advancement request flag 161 representing the presence of the advancement request based on drowsy driving is input from the advancement request determination unit 155. If the first advancement request flag 161 representing the presence of the advancement request based on drowsy driving is input from the advancement request determination unit 155 (YES in step S1005), the processing proceeds to step S1010. Meanwhile, if the first advancement request flag 161 representing the presence of the advancement request based on drowsy driving is not input from the advancement request determination unit 155 (NO in step S1005), the processing proceeds to step S1015. In step S1010, the alarm controller 157 changes the alarm timing to the "early" alarm timing. Thereafter, the operation in FIG. 4 ends.

In step S1015, the alarm controller 157 determines whether the second advancement request flag 162 representing the presence of the advancement request based on inattentive driving is input from the advancement request determination unit 155. If the second advancement request flag 162 representing the presence of the advancement request based on inattentive driving is input from the advancement request determination unit 155 (YES in step S1015), the processing proceeds to step S1020. Meanwhile, if the second advancement request flag 162 representing the presence of the advancement request based on inattentive driving is not input from the advancement request determination unit 155 (NO in step S1015), the processing proceeds to step S1100 in FIG. 5.

In step S1020, the alarm controller 157 determines whether the second determination flag 166 representing that the second delay condition is established is input from the delay condition determination unit 156. If the second determination flag 166 representing that the second delay condition is established is input from the delay condition determination unit 156, namely, if the second delay condition is established (YES in step S1020), the processing proceeds to step S1025. Meanwhile, if the second delay condition is not established (NO in step S1020), the processing proceeds to step S1030. In step S1025, the alarm controller 157 changes the alarm timing to the "delay" alarm timing. Thereafter, the operation in FIG. 4 ends.

In step S1030, the alarm controller 157 determines whether the setting timing by the alarm timing setting switch 141 is the "medium" alarm timing. If the setting timing by the alarm timing setting switch 141 is the "medium" alarm timing (YES in step S1030), the processing proceeds to step S1035. Meanwhile, if the setting timing by the alarm timing setting switch 141 is the "early" or "late" alarm timing (NO in step S1030), the processing proceeds to step S1040.

In step S1035, the alarm controller 157 changes the alarm timing to the "early" alarm timing. Thereafter, the operation in FIG. 4 ends. In step S1040, if the setting timing by the alarm timing setting switch 141 is the "early" alarm timing, the alarm controller 157 maintains the "early" alarm timing since no earlier timing is set. Furthermore, if the setting timing by the alarm timing setting switch 141 is the "late" alarm timing, as described above, the intention of the driver is respected, and the "late" alarm timing is maintained. Thus, in step S1040, in either case of the "early" or "late" setting timing by the alarm timing setting switch 141, the alarm controller 157 maintains the alarm timing at the setting timing by the alarm timing setting switch 141. Thereafter, the operation in FIG. 4 ends.

In step S1100 in FIG. 5, the alarm controller 157 determines whether the second determination flag 166 representing that the second delay condition is established is input from the delay condition determination unit 156. If the second determination flag 166 representing that the second delay condition is established is input from the delay condition determination unit 156, namely, if the second delay condition is established (YES in step S1100), the processing proceeds to step S1105. Meanwhile, if the second delay condition is not established (NO in step S1100), the processing proceeds to step S1110. In step S1105, the alarm controller 157 changes the alarm timing to the "delay" alarm timing. Thereafter, the operations in FIGS. 4 and 5 end.

In step S1110, the alarm controller 157 determines whether the first determination flag 165 representing that the first delay condition is established is input from the delay condition determination unit 156. If the first determination flag 165 representing that the first delay condition is established is input from the delay condition determination unit 156, namely, if the first delay condition is established (YES in step S1110), the processing proceeds to step S1105. Meanwhile, if the first delay condition is not established (NO in step S1110), the processing proceeds to step S1115. In step S1115, the alarm controller 157 maintains the alarm timing at the setting timing by the alarm timing setting switch 141. Thereafter, the operations in FIGS. 4 and 5 end.

(Effects)

As explained above, in the present embodiment, even when the line-of-sight determination unit 136 determines that the driver is inattentive while driving, when the second delay condition is determined to be established, the driver is determined to be visually recognizing the surrounding situation, not inattentive while driving, and the alarm controller 157 changes the alarm timing to the "delay" alarm timing. Therefore, according to the present embodiment, a situation where the driver feels annoyed at an early activation of the alarm device 140 can be avoided.

Furthermore, in the present embodiment, even when the first delay condition is determined to be established, when the line-of-sight determination unit 136 determines that the driver is inattentive while driving, the alarm controller 157 changes the alarm timing from the "medium" alarm timing to the "early" alarm timing. Therefore, according to the present embodiment, when necessary, the alarm device 140 can be activated early to warn the driver.

Furthermore, in the present embodiment, when the "late" alarm timing is set by the alarm timing setting switch 141, even when the line-of-sight determination unit 136 determines that the driver is inattentive while driving, the "late" alarm timing is maintained. Therefore, according to the present embodiment, the situation where the driver feels annoyed at an early activation of the alarm device 140 can be avoided by respecting the decision of the driver.

Furthermore, in the present embodiment, when the drowsy-driving determination unit 135 determines that the driver is drowsy while driving, the alarm controller 157, regardless of the setting timing of the alarm timing setting switch 141, changes the alarm timing to the "early" alarm timing. Therefore, according to the present embodiment, when necessary, the alarm device 140 can be activated early to warn the driver.

Modified Embodiment (1) In the above embodiment, the CPU 151, by operating according to the control program stored in the memory 152, may further function as an obstacle calculation unit 180 (FIG. 1). The obstacle calculation unit 180 calculates the predicted time to collision with the obstacle in front (for example, a preceding vehicle) detected by the obstacle detection unit 110. When further the alarm timing (namely, T1 seconds before, T2 seconds before, T3 seconds before, or T4 seconds before the time when the predicted time to collision is reached) is reached, the alarm controller 157 activates the alarm device 140. According to this modified embodiment, the alarm device 140 can be activated at an appropriate timing.

(2) In the above embodiment, the vehicle alarm apparatus 10 may include a map data storage unit 170 (FIG. 1). The map data storage unit 170 stores data relating to roads. The CPU 151 may determine a position of the vehicle 100 by using, for example, a global positioning system (GPS). The CPU 151 may acquire a turning radius of a road on which the vehicle 100 is traveling, from the determined position of the vehicle 100 and the data relating to roads stored in the map data storage unit 170. In this case, the vehicle alarm apparatus 10 may not include any yaw rate sensor and any vehicle velocity sensor.

(3) In the above embodiment, the driving operation detection unit 120 may further include a wiper switch 171 (FIG. 1). The vehicle 100 may further include a wiper 172 (FIG. 1) that is activated when the wiper switch 171 is turned on. When the wiper switch 171 is turned on, the delay condition determination unit 156 determines that it is raining, and regardless of the establishment requirements indicated at the leftmost column of the delay information 200, may determine that both the first delay condition and the second delay condition are not established. According to this modified embodiment, the alarm timing is not delayed in the case of rain, and thus the alarm device 140 can be activated at an appropriate alarm timing.

(4) In the above embodiment, a position where the CPU is disposed and the number of CPUs are not limited to the configuration shown in FIG. 1. For example, although in the above embodiment, the driver monitor 130 includes the CPU 133, the driver monitor 130 may not include any CPU, and the ECU 150 may include a CPU that performs the same function as the CPU 133. In this case, the camera 131 may output the driver's data obtained by the image-capturing to the ECU 150. For example, in the above embodiment, the ECU 150 includes one CPU, but alternatively, the ECU 150 may include a plurality of CPUs. For example, although in the above embodiment, the obstacle detection unit 110 does not include any CPU, the obstacle detection unit 110 may include a CPU.

The above-described specific embodiment mainly includes the invention having the following configurations.

An aspect of the technology disclosed herein is a vehicle alarm apparatus that activates an alarm device at an alarm timing based on a predicted time to collision with an obstacle in front of a vehicle, the vehicle alarm apparatus including an obstacle detection unit configured to detect the obstacle, an image-capturing unit configured to capture an image of a driver, a line-of-sight determination unit configured to determine a line-of-sight direction, based on a face orientation and a pupil that are included in a captured image of the driver, a driving operation detection unit configured to detect a requested acceleration based on an accelerator operation of the driver, or a turn-signal-lamp switch operation for activating a turn signal lamp of the vehicle, and a controller configured to set the alarm timing, based on an output of the line-of-sight determination unit and an output of the driving operation detection unit, wherein when the requested acceleration that is equal to or more than a predetermined acceleration, or the turn-signal-lamp switch operation is detected, the controller activates the alarm device at a timing more delayed than the alarm timing.

When the acceleration that is equal to or more than the predetermined acceleration is requested, or when the turn-signal-lamp switch operation is performed, it is conceivable that, for example, the driver tries to pass the vehicle in front. Accordingly, in this aspect, the alarm device is activated at the timing more delayed than the previously determined alarm timing. Therefore, according to this aspect, a situation where the driver feels annoyed at an alarm can be reduced.

In the above aspect, preferably, there is further provided a drowsy-driving determination unit configured to determine whether the driver is drowsy while driving, based on the captured image of the driver, wherein even when the requested acceleration that is equal to or more than the predetermined acceleration, or the turn-signal-lamp switch operation is detected, when the driver is determined to be drowsy while driving, the controller does not change the alarm timing to the delayed timing.

In this aspect, even when the requested acceleration that is equal to or more than the predetermined acceleration, or the turn-signal-lamp switch operation is detected, when the driver is determined to be drowsy while driving, the alarm timing is not changed to the delayed timing. Therefore, according to this aspect, the alarm can be certainly issued when necessary. In this aspect, when the driver is determined to be drowsy, the controller may advance the alarm timing to an earlier timing than the previously determined alarm timing.

In the above aspect, preferably, there is further provided a vehicle velocity sensor configured to detect a velocity of the vehicle, wherein the driving operation detection unit detects a turn-signal-lamp switch operation for activating a turn signal lamp of the vehicle, and when the turn-signal-lamp switch operation is detected and it is detected that the velocity of the vehicle is equal to or more than a predetermined velocity, the controller activates the alarm device at a timing more delayed than the alarm timing.

For example, in a case where an obstacle present in front of the vehicle is detected, when the turn-signal-lamp switch operation is performed and the velocity of the vehicle is equal to or more than the predetermined velocity, it is more certainly conceivable that the driver tries to pass the vehicle in front. Accordingly, in this aspect, when the turn-signal-lamp switch operation is detected and it is detected that the velocity of the vehicle is equal to or more than the predetermined velocity, the alarm device is activated at the timing more delayed than the alarm timing. Therefore, according to the present aspect, when it is more certain that the driver tries to pass the vehicle in front, the situation where the driver feels annoyed at the alarm can be reduced.

In the above aspect, preferably, there is further provided a drowsy-driving determination unit configured to determine whether the driver is drowsy while driving, based on the captured image of the driver, wherein even when the turn-signal-lamp switch operation is detected and it is detected that the velocity of the vehicle is equal to or more than the predetermined velocity, when the driver is determined to be drowsy while driving, the controller does not change the alarm timing to the delayed timing.

In this aspect, even when the turn-signal-lamp switch operation is detected and it is detected that the velocity of the vehicle is equal to or more than the predetermined velocity, when the driver is determined to be drowsy while driving, the alarm timing is not changed to the delayed timing. Therefore, according to this aspect, the alarm can be certainly issued when necessary. In this aspect, when the driver is determined to be drowsy while driving, the controller may advance the alarm timing to an earlier timing than the previously determined alarm timing.

In the above aspect, preferably, the line-of-sight determination unit determines whether the driver is inattentive while driving, based on a determination result of the line-of-sight direction of the driver, and only when the driver is determined to be not inattentive while driving, the controller activates the alarm device at a timing more delayed than the alarm timing.

If the driver is not inattentive while driving, it is conceivable that the driver is concentrating on driving the vehicle. Accordingly, in this aspect, only when the driver is determined to be not inattentive while driving, the alarm device is activated at the timing more delayed than the previously determined alarm timing. Therefore, according to this aspect, the situation where the driver feels annoyed at the alarm can be reduced.

In the above aspect, preferably, there is further provided a drowsy-driving determination unit configured to determine whether the driver is drowsy while driving, based on the captured image of the driver, wherein even when the driver is determined to be not inattentive while driving, when the driver is determined to be drowsy while driving, the controller does not change the alarm timing to the delayed timing.

In this aspect, even when the driver is determined to be not inattentive while driving, when the driver is determined to be drowsy while driving, the alarm timing is not changed to the delayed timing. Therefore, according to this aspect, the alarm can be certainly issued when necessary. In this aspect, when the driver is determined to be drowsy while driving, the controller may advance the alarm timing to an earlier timing than the previously determined alarm timing.

In the above aspect, preferably, only when the obstacle is detected, the controller activates the alarm device.

According to this aspect, when the obstacle in front of the vehicle is not detected, the alarm device is not activated, and thus the situation where the driver feels annoyed at the alarm can be reduced.

The invention claimed is:

1. A vehicle alarm apparatus that activates an alarm device at an alarm timing based on a predicted time to collision with an obstacle in front of a vehicle, the vehicle alarm apparatus comprising:
    an obstacle detection unit configured to detect the obstacle;
    an image-capturing unit configured to capture an image of a driver;
    a line-of-sight determination unit configured to determine a line-of-sight direction, based on a face orientation and a pupil that are included in a captured image of the driver;
    a driving operation detection unit configured to detect a requested acceleration based on an accelerator operation of the driver, or based on a turn-signal-lamp switch operation for activating a turn signal lamp of the vehicle; and
    a controller configured to set the alarm timing, based on an output of the line-of-sight determination unit and an output of the driving operation detection unit,
    wherein when the requested acceleration that is equal to or more than a predetermined acceleration, or under a condition the turn-signal-lamp switch operation is detected, the controller activates the alarm device at a timing more delayed than the alarm timing.

2. The vehicle alarm apparatus according to claim 1, further comprising
    a drowsy-driving determination unit configured to determine whether the driver is drowsy while driving, based on the captured image of the driver,
    wherein even when the requested acceleration that is equal to or more than the predetermined acceleration, or the turn-signal-lamp switch operation is detected, when the driver is determined to be drowsy while driving, the controller does not change the alarm timing to the delayed timing.

3. The vehicle alarm apparatus according to claim 1, further comprising
    a vehicle velocity sensor configured to detect a velocity of the vehicle,
    wherein the driving operation detection unit detects a turn-signal-lamp switch operation for activating a turn signal lamp of the vehicle, and
    when the turn-signal-lamp switch operation is detected and it is detected that the velocity of the vehicle is equal to or more than a predetermined velocity, the controller activates the alarm device at a timing more delayed than the alarm timing.

4. The vehicle alarm apparatus according to claim 3, further comprising
    a drowsy-driving determination unit configured to determine whether the driver is drowsy while driving, based on the captured image of the driver,
    wherein even when the turn-signal-lamp switch operation is detected and it is detected that the velocity of the vehicle is equal to or more than the predetermined velocity, when the driver is determined to be drowsy while driving, the controller does not change the alarm timing to the delayed timing.

5. The vehicle alarm apparatus according to claim 1, wherein the line-of-sight determination unit determines whether the driver is inattentive while driving, based on a determination result of the line-of-sight direction of the driver, and
    only when the driver is determined to be not inattentive while driving, the controller activates the alarm device at a timing more delayed than the alarm timing.

6. The vehicle alarm apparatus according to claim 5, further comprising
    a drowsy-driving determination unit configured to determine whether the driver is drowsy while driving, based on the captured image of the driver,
    wherein even when the driver is determined to be not inattentive while driving, when the driver is determined to be drowsy while driving, the controller does not change the alarm timing to the delayed timing.

7. The vehicle alarm apparatus according to claim 1, wherein only when the obstacle is detected, the controller activates the alarm device.

8. The vehicle alarm apparatus according to claim 2, further comprising
a vehicle velocity sensor configured to detect a velocity of the vehicle,
wherein the driving operation detection unit detects a turn-signal-lamp switch operation for activating a turn signal lamp of the vehicle, and
when the turn-signal-lamp switch operation is detected and it is detected that the velocity of the vehicle is equal to or more than a predetermined velocity, the controller activates the alarm device at a timing more delayed than the alarm timing.

9. The vehicle alarm apparatus according to claim 8, further comprising
a drowsy-driving determination unit configured to determine whether the driver is drowsy while driving, based on the captured image of the driver,
wherein even when the turn-signal-lamp switch operation is detected and it is detected that the velocity of the vehicle is equal to or more than the predetermined velocity, when the driver is determined to be drowsy while driving, the controller does not change the alarm timing to the delayed timing.

10. The vehicle alarm apparatus according to claim 2,
wherein the line-of-sight determination unit determines whether the driver is inattentive while driving, based on a determination result of the line-of-sight direction of the driver, and
only when the driver is determined to be not inattentive while driving, the controller activates the alarm device at a timing more delayed than the alarm timing.

11. The vehicle alarm apparatus according to claim 3,
wherein the line-of-sight determination unit determines whether the driver is inattentive while driving, based on a determination result of the line-of-sight direction of the driver, and
only when the driver is determined to be not inattentive while driving, the controller activates the alarm device at a timing more delayed than the alarm timing.

12. The vehicle alarm apparatus according to claim 8,
wherein the line-of-sight determination unit determines whether the driver is inattentive while driving, based on a determination result of the line-of-sight direction of the driver, and
only when the driver is determined to be not inattentive while driving, the controller activates the alarm device at a timing more delayed than the alarm timing.

13. The vehicle alarm apparatus according to claim 4,
wherein the line-of-sight determination unit determines whether the driver is inattentive while driving, based on a determination result of the line-of-sight direction of the driver, and
only when the driver is determined to be not inattentive while driving, the controller activates the alarm device at a timing more delayed than the alarm timing.

14. The vehicle alarm apparatus according to claim 9,
wherein the line-of-sight determination unit determines whether the driver is inattentive while driving, based on a determination result of the line-of-sight direction of the driver, and
only when the driver is determined to be not inattentive while driving, the controller activates the alarm device at a timing more delayed than the alarm timing.

15. The vehicle alarm apparatus according to claim 10, further comprising
a drowsy-driving determination unit configured to determine whether the driver is drowsy while driving, based on the captured image of the driver,
wherein even when the driver is determined to be not inattentive while driving, when the driver is determined to be drowsy while driving, the controller does not change the alarm timing to the delayed timing.

16. The vehicle alarm apparatus according to claim 11, further comprising
a drowsy-driving determination unit configured to determine whether the driver is drowsy while driving, based on the captured image of the driver,
wherein even when the driver is determined to be not inattentive while driving, when the driver is determined to be drowsy while driving, the controller does not change the alarm timing to the delayed timing.

17. The vehicle alarm apparatus according to claim 12, further comprising
a drowsy-driving determination unit configured to determine whether the driver is drowsy while driving, based on the captured image of the driver,
wherein even when the driver is determined to be not inattentive while driving, when the driver is determined to be drowsy while driving, the controller does not change the alarm timing to the delayed timing.

18. The vehicle alarm apparatus according to claim 13, further comprising
a drowsy-driving determination unit configured to determine whether the driver is drowsy while driving, based on the captured image of the driver,
wherein even when the driver is determined to be not inattentive while driving, when the driver is determined to be drowsy while driving, the controller does not change the alarm timing to the delayed timing.

19. The vehicle alarm apparatus according to claim 14, further comprising
a drowsy-driving determination unit configured to determine whether the driver is drowsy while driving, based on the captured image of the driver,
wherein even when the driver is determined to be not inattentive while driving, when the driver is determined to be drowsy while driving, the controller does not change the alarm timing to the delayed timing.

\* \* \* \* \*